(12) United States Patent
Rozman et al.

(10) Patent No.: US 8,912,765 B2
(45) Date of Patent: Dec. 16, 2014

(54) EPGS ARCHITECTURE WITH MULTI-CHANNEL SYNCHRONOUS GENERATOR AND COMMON UNREGULATED PMG EXCITER

(71) Applicant: Hamilton Sundstrand Corporation, Windsor Locks, CT (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/836,007

(22) Filed: Mar. 15, 2013

(65) Prior Publication Data

US 2014/0266076 A1    Sep. 18, 2014

(51) Int. Cl.
*H02P 11/00*    (2006.01)
(52) U.S. Cl.
USPC ............................................. 322/24; 363/71
(58) Field of Classification Search
USPC ............................ 322/22, 23, 24, 25; 363/71
See application file for complete search history.

(56) References Cited

U.S. PATENT DOCUMENTS

| | | | |
|---|---|---|---|
| 4,841,216 A | 6/1989 | Okada et al. | |
| 5,055,765 A | 10/1991 | Rozman et al. | |
| 5,325,043 A | 6/1994 | Parro | |
| 5,363,032 A | 11/1994 | Hanson et al. | |
| 5,764,036 A | 6/1998 | Vaidya et al. | |
| 6,281,664 B1 * | 8/2001 | Nakamura et al. | 322/22 |
| 7,053,590 B2 | 5/2006 | Wang | |
| 7,064,524 B2 | 6/2006 | Yao | |
| 7,196,498 B2 * | 3/2007 | Yao | 322/25 |
| 7,282,893 B2 | 10/2007 | Yao | |
| 7,439,713 B2 | 10/2008 | Dooley | |
| 8,237,416 B2 | 8/2012 | Rozman et al. | |
| 8,358,111 B2 | 1/2013 | Rozman et al. | |
| 8,427,116 B2 | 4/2013 | Rozman et al. | |
| 8,699,251 B2 * | 4/2014 | Rozman et al. | 363/71 |

\* cited by examiner

*Primary Examiner* — Nicholas Ponomarenko
(74) *Attorney, Agent, or Firm* — Cantor Colburn LLP

(57) ABSTRACT

A generator system includes a generator having a stationary portion and a rotating portion. The generator includes a permanent magnet based exciter with permanent magnets disposed on the stationary portion. A first channel includes a first main field winding and a first main field power converter disposed on a rotating portion. The first main field power converter selectively delivers voltage from the exciter winding to the first main field winding. A second channel includes a second main field winding and a second main field power converter disposed on the rotating portion. The second main field power converter selectively delivers voltage from the exciter winding to the second main field winding. A generator control unit is connected to the first channel and the second channel. The generator control unit monitors an output voltage at each of the first channel and the second channel and generates the first and second control signals based on the output voltage.

16 Claims, 2 Drawing Sheets

EPGS ARCHITECTURE WITH MULTI-CHANNEL SYNCHRONOUS GENERATOR AND COMMON UNREGULATED PMG EXCITER

CROSS-REFERENCE TO RELATED APPLICATION(S)

Reference is made to application Ser. No. 13/833,809, entitled "GENERATOR ARCHITECTURE WITH MAIN FIELD ROTATING POWER CONVERTER", application Ser. No. 13/833,212, entitled "GENERATOR ARCHITECTURE WITH PMG EXCITER AND MAIN FIELD ROTATING POWER CONVERTER", application Ser. No. 13/836,428, entitled "EPGS ARCHITECTURE WITH MULTI-CHANNEL SYNCHRONOUS GENERATOR AND COMMON FIELD REGULATED EXCITER", application Ser. No. 13/836,255, entitled "METHOD OF CONTROLLING ROTATING MAIN FIELD CONVERTER", and application Ser. No. 13/835,089, entitled "VARIABLE SPEED CONSTANT FREQUENCY SYSTEM WITH GENERATOR AND ROTATING POWER CONVERTER", which are filed on even date herewith, are assigned to same assignee as this application, and which the entire disclosure off all above-reference applications hereby being incorporated by reference.

BACKGROUND

The present inventive concept is related to generator architectures and in particular to generator architectures utilizing main field rotating power converters.

In the simplest terms, generators convert mechanical energy to electrical energy via the interaction of rotating magnetic fields and coils of wire. A multitude of generator architectures have been developed with various means of providing interaction between magnetic fields and coils of wire. For example, a permanent magnet generator (PMG) utilizes permanent magnets to generate a constant magnetic field, which is rotated via the mechanical energy supplied by a prime mover such that the rotating magnetic field interacts with the stator coils to provide an output voltage. Another type of generator supplies current through a coil to generate the desired magnetic field, which is rotated via the mechanical energy supplied by a prime mover, such that a rotating magnetic field is created that interacts with stator coils to provide an output voltage.

In the former example, the output voltage supplied by the PMG depends only on the magnitude of the mechanical energy supplied by the prime mover. In the latter example, the output voltage of the generator can be regulated by varying the current supplied to the field coil. For applications in which the output voltage must be regulated, the latter example, known as a wound field synchronous machine, is widely utilized. A PMG is sometimes utilized in conjunction with the wound field synchronous machine to source the current supplied to an exciter field winding to regulate the output of the brushless wound field synchronous machine.

For example, in aircraft applications, a typical variable frequency generator (VFG) includes a permanent magnet section, an exciter section, and a main generator section. The permanent magnet portion includes permanent magnets employed on the rotating portion, which generate an alternating current voltage on the stator portion. The AC voltage provided by the permanent magnet portion is rectified and selectively applied to the exciter field winding on the stationary portion of the exciter. The exciter field current interacts with the rotating exciter armature windings to provide AC voltage. A rotating rectifier rectifies the AC voltage and supplies the DC voltage to a main field winding on the rotating portion of the main generator section. Rotation of the motive power shaft and the main field winding induces three-phase AC output voltage on the main generator armature winding. The magnitude of the AC generator output voltage is regulated by controlling the current supplied to the exciter coil on the stationary portion of the exciter. On characteristic of this architecture is that the output of the generator may be a function of the rotational speed of the generator and load. In cases with a belt-type interface between prime mover shaft and the generator shaft sudden load changes may also result in sudden changes in generator speed. As a result, sudden variations of the generator output voltage, such as sudden voltage increases, may occur. There is a need to improve voltage regulation. There is also a need to simplify control by replacing a field regulated exciter with an unregulated PMG-based exciter.

SUMMARY

In at least one embodiment, a generator system includes a generator having a stationary portion and a rotating portion. The generator includes an exciter PMG disposed on the stationary portion. A first channel includes a first main field winding and a first main field power converter disposed on the rotating portion. The first main field power converter selectively delivers voltage from the exciter armature winding via a rotating rectifier to the first main field winding in response to a first channel control signal. A second channel includes a second main field winding and a second main field power converter disposed on the rotating portion. The second main field power converter selectively delivers voltage from the exciter armature winding via a rotating rectifier to the second main field winding in response to a second channel control signal. A generator control unit is in electrical communication with the first channel and the second channel. The generator control unit monitors an output voltage at each of the first channel and the second channel and generates the first and second control signals based on the output voltage.

In another embodiment, a generator comprises an exciter armature winding disposed on the rotating portion to realize a voltage. The generator further comprises a first channel and a second channel. The first channel includes a first main field winding disposed on a rotating portion of the generator, at least one first secondary primary winding disposed on the rotating portion, and a first main field power converter disposed on the rotating portion. The first main field power converter is configured to selectively deliver the voltage from the exciter armature winding via a rotating rectifier to the first main field winding in response to a first channel control signal. The second channel includes a second main field winding disposed on a rotating portion of the generator, at least one second secondary primary winding disposed on the rotating portion, and a second main field power converter disposed on the rotating portion. The second main field power converter is configured to selectively deliver the voltage from the exciter armature winding via a rotating rectifier to the second main field winding in response to a second channel control signal.

DETAILED DESCRIPTION

Figure 1:
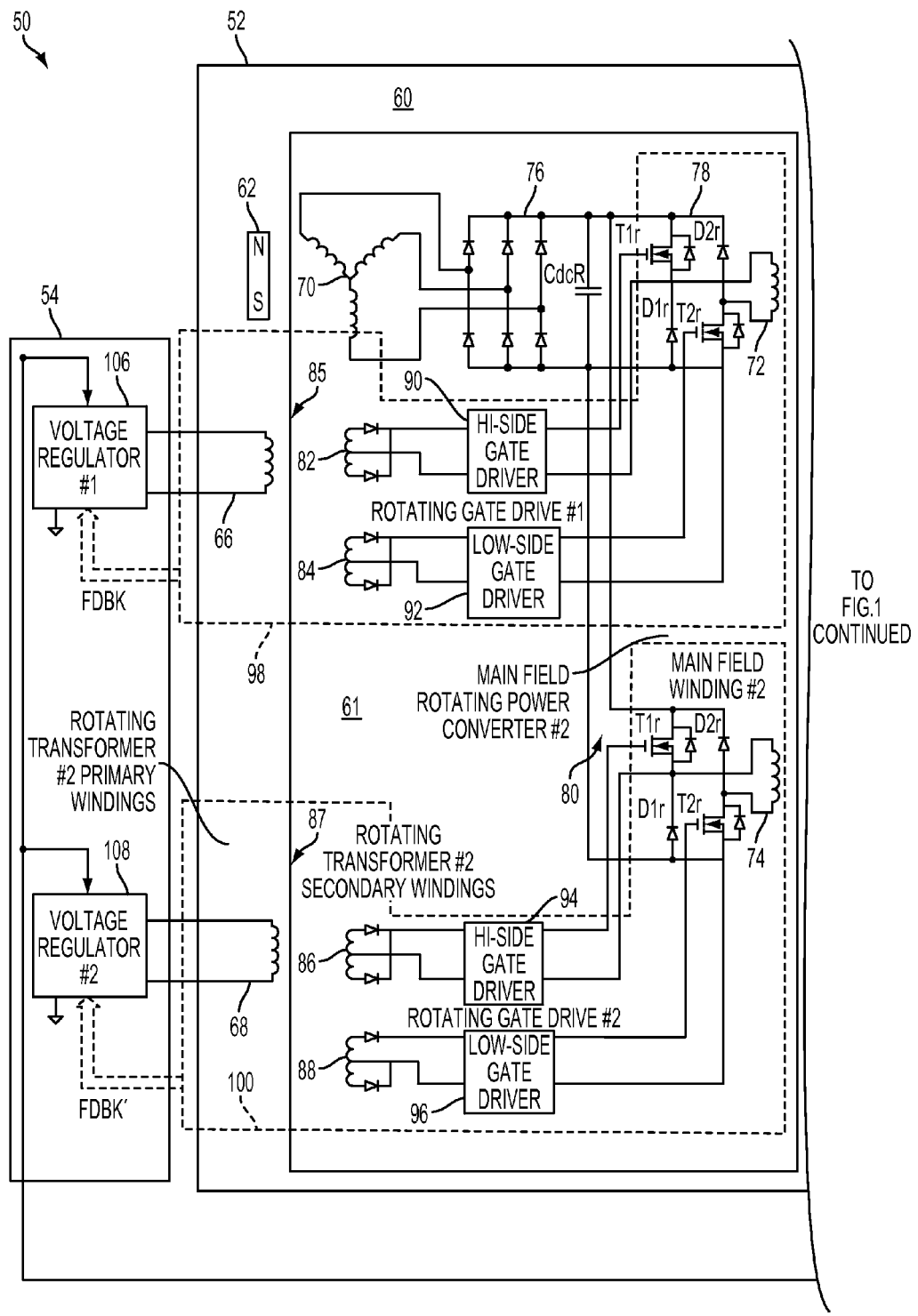
FIG. 1 is a circuit diagram of multi-channel electric power generation and distribution system according to an embodiment of the present inventive concept.
Figure 1:
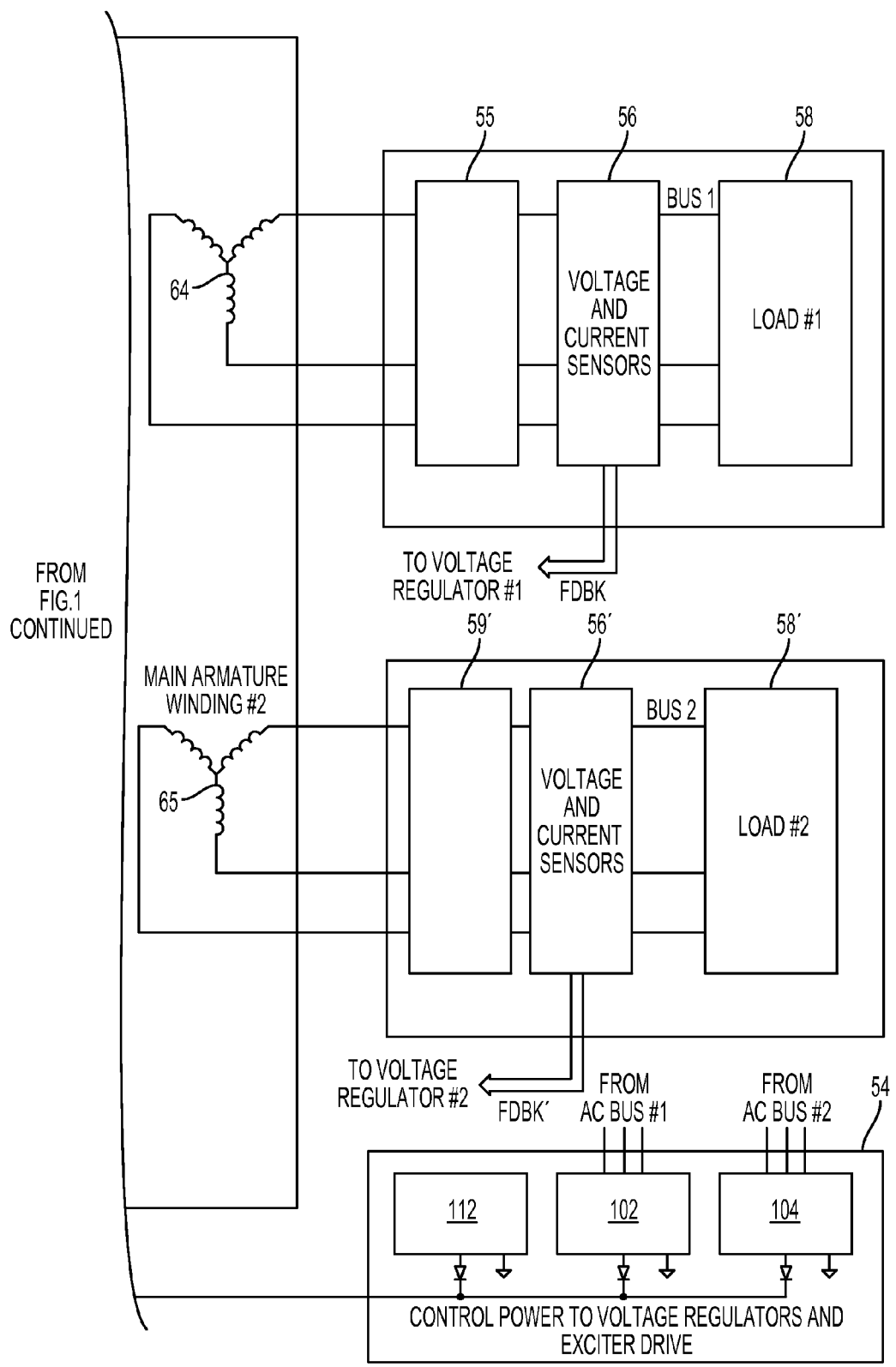

FIG. 1 is a circuit diagram of electric power generation and distribution system 50 according to an embodiment of the present inventive concept. System 50 includes a multi-channel generator 52 and a generator control unit (GCU) 54. At the output of each channel of the generator 52, the system 50 may include a three-phase rectifier 55, a current/voltage sensor 56, and a load 58. The three-phase rectifier 55 may rectify an output AC voltage into a DC output voltage utilized by the load 58. The a current/voltage sensor 56 may be interposed between the three-phase rectifier 55 and the load 56 to monitor the current and voltage output from the respective channel. In addition, the system 50 may further include an AC load/management system 58 connected to the output of each channel of the generator 52.

Generator 52 includes stationary portion 60 and rotating portion 61. Stationary portion 60 includes a permanent magnet 62, a first main armature winding 64, a second main armature winding 65, a first channel primary winding 66, and a second channel primary winding 68. Rotating portion 61 includes exciter armature winding 70, a first channel main field winding 72, a second channel main field winding 74, a rotating rectifier 76, a first main field rotating power converter 78, and a second main field rotating converter 80, first channel secondary windings 82 and 84, and second channel secondary windings 86 and 88. Windings 66, 82, and 84 represent windings of a first rotating transformer 85 used to pass control signals across the air gap to control the main field power converter 76 of first channel. Windings 68, 86, and 88 represent windings of a second rotating transformer 87 used to pass control signals across the air gap to control the main field power converter 80 of second channel.

The permanent magnet generates 62 a magnetic field that is realized across an air gap by the exciter armature winding 70. As the rotating portion 61 rotates with respect to the permanent magnet 62, an AC voltage is induced across the arms of the exciter armature winding 70. The rotating rectifier 76 rectifies the AC voltage supplied by the exciter armature winding 70 into a DC voltage, and outputs the rectified DC voltage to the first and second main field rotating power converters 76, 80. The first main field rotating power converter 76 selectively delivers the rectified DC voltage to the first channel main field winding 72, and the second main field rotating power converter 80 selectively delivers the rectified DC voltage to the second channel main field winding 74.

The rotating portion 61 further includes a first secondary winding 82, a second secondary winding 84, a third secondary winding 86, a fourth secondary winding 88, a first hi-side gate driver 90, a first lo-side gate driver 92, a second high-side gate driver 94, and a second lo-side gate driver 96. Accordingly, a first channel 98 of the generator 52 includes the first channel primary winding 66, the first and second secondary windings 82, 84, the first hi-side driver 90, the first lo-side driver 92, the first main field rotating power converter 76, and the first channel main field winding 72. A second channel 100 of the 52 includes the second channel primary winding 68, the third and fourth secondary windings 86, 88, the second hi-side driver 94, the second lo-side driver 96, the second main field rotating power converter 80, and the second channel main field winding 74. Although two channels are illustrated in FIG. 1, it is appreciated that a single channel may be used in the generator, or additional channels, e.g., three channels, four channels, five channels, etc., may be included.

In the embodiment shown in FIG. 1, each of the first and second main field rotating power converters 78, 80 include a high-side switch T1r, a low-side switch T2r, and diodes D1r and D2r. By controlling the high-side/low-side switches T1r, T2r, each individual channel 98, 100 may be independently controlled. For example, when switches T1r and T2r of the first main field rotating power converter 76 and/or second main field rotating power converter 80 are both turned On, then the positive DC voltage provided by rotating rectifier is applied to the respective channel main field winding 72,74 and allows current to build up in the respective channel main field winding 72,74. In particular, a conductive current path is created from the DC output of rotating rectifier through switch T1r to the respective main field winding, and then through switch T2r. When switches T1r and T2r of the first main field rotating power converter 76 and/or second main field rotating power converter 80 are both Off, then current from rotating rectifier is prevented from being supplied to the respective main field winding. In this embodiment, current through the respective first channel and/or second channel main field winding 72,74 is controlled by regulating current in the respective primary winding 66, 68 of the respective rotating transformers 85,87.

More specifically, the GCU 54 includes a first AC/DC converter 102, a second AC/DC converter 104, a first voltage regulator 106, a second voltage regulator 108, and an exciter converter 110. An independent power source, such as a battery 112, may be provided to power various components of the GCU 54. The first AC/DC converter 106 is connected to the output of the first channel 98 and converts the AC voltage and/or current signal into a DC signal indicating the voltage and/or current at the output of the first channel 98. Similarly, the second AC/DC converter 104 is connected to the output of the second channel 100.

The first and second voltage regulators of the GCU 54 receive feedback voltage and/or current signals from the respective voltage/current sensors 56 and may compare the voltages existing at the output of each respective channel 90, 100 to a predetermined threshold. The voltage regulation is achieved by keeping switch T2r closed and fixed frequency pulse width modulating (PWM) switch T1r in response to the output voltage of a respective channel 98,100. When T1r is on, the voltage from a rotating DC bus is applied across the respective main field winding 72, 74, the main field current increases. When switch T1r is turned off, the main field current circulates through T2r and D2r and decreases. To balance switching losses between T1r and T2r, operation of the switches may be alternating, i.e., keeping T1r closed and PWM T2r for a period of time, and then keeping T2r closed and PWM T1r. During overvoltage (i.e., when the output voltage exceeds a predetermined voltage threshold) and/or other abnormal operation, both switches T1r and T2r may be turned off. In this case the voltage across the main field winding becomes negative (reverses sign of the rotating DC bus voltage). This causes the respective main field current to decrease rapidly to zero. The inductive energy stored in the respective main field winding 72, 74 is fed back to a rotating power supply. In at least one embodiment, the rotating power supply may include an armature winding of the exciter, rotating 6-pulse rectifier, and a rotating DC bus capacitor CdcR.

The command generated by GCU 54 is communicated to the first main field rotating power converter 76 via the first channel primary winding 66 and is communicated to the second main field rotating power converter 80 via the second channel primary winding 68. In response to the received command, the first hi-side driver 90 and first lo-side driver 92 turn On/Off switches T1r and T2r of the first main field rotating power converter 76, and the second hi-side driver 94 and second lo-side driver 96 turn On/Off switches T1r and T2r of the second main field rotating power converter 80 as discussed above.

While the present inventive concept has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present general inventive concept not be limited to the particular embodiment(s) disclosed, but that the present general inventive concept will include all embodiments falling within the scope of the appended claims.

What is claimed is:

1. A generator system comprising:
    a generator having a stationary portion and a rotating portion, the generator comprising:
        a permanent magnet disposed on the stationary portion to generate n magnetic field;
        an exciter armature winding disposed on the rotating portion to realize the magnetic field, and configured to generate an AC voltage in response to rotationally interacting with the magnetic field;
        a first channel including a first main field winding disposed on the rotating portion, and a first main field power converter disposed on the rotating portion that selectively delivers voltage from the main armature winding to the first main field winding in response to a first channel control signal; and
        a second channel including a second main field winding disposed on the rotating portion, and a second main field power converter disposed on the rotating portion that selectively delivers voltage from the main armature winding to the second main field winding in response to a second channel control signal; and
    a generator control unit in electrical communication with the first channel and the second channel, the generator control unit configured to monitor an output voltage at each of the first channel and the second channel and to generate the first and second control signals based on the output voltage.

2. The generator system of claim 1, wherein the generator control unit controls the first main field power convert of the first channel independently from the second main field power convert of the second channel.

3. The generator system of claim 2, wherein the generator control unit detects an overvoltage condition of at least one of the first channel and the second channel and generates the respective first and second control signal that disables the respective first and second main field power converter to remove excitation from the respective first and second main field winding.

4. The generator system of claim 3, wherein the generator control unit disables the first main field power converter to cutoff voltage to the first main field winding, while enabling the second main field power converter to maintain voltage to the second main field winding.

5. The generator system of claim 4, wherein
    the first channel further comprises:
        a first channel primary winding disposed on the stationary portion and in electrical communication with the generator control unit to receive the first control signal therefrom; and
        at least one first channel secondary winding disposed on the rotating portion to receive the first control signal from the first channel primary winding; and
    the second channel further comprises:
        a second channel primary winding disposed on the stationary portion and in electrical communication with the generator control unit to receive the second control signal therefrom; and
        at least one second channel secondary winding disposed on the rotating portion to receive the second control signal from the second channel primary winding.

6. The generator system of claim 5, wherein each of the first and second main field rotating power converters comprise:
    a high-side switch connected between a positive DC voltage of a rotating DC bus and a high side of a respective main field winding;
    a low-side switch connected between a negative DC voltage of the rotating DC bus and a low side of a respective main field winding;
    a first diode connected between the high side of a respective main field winding and the negative DC voltage; and
    a second diode connected between the low side of a respective main field winding and the positive DC voltage.

7. The generator system of claim 6, wherein the high-side switch and the low-side switch are turned On to allow the DC voltage provided by the rotating DC bus to be supplied to a respective main field winding and turned Off to rapidly decrease current to zero in a respective main field winding via the first and second diode.

8. The generator system of claim 7, wherein the at least one first channel secondary winding includes a first channel secondary winding that delivers a first control command to the high-side switch of the main field rotating power converter and second channel secondary winding that delivers a second control command to the low-side switch of the first main field rotating power converter, and the at least one second channel secondary winding includes a third channel secondary winding that delivers a third control command to the high-side switch of the second main field power converter and fourth channel secondary winding that delivers a fourth control command to the low-side switch of the second main field rotating power converter.

9. A generator comprising:
    a permanent magnet disposed on the stationary portion to generate a magnetic field;
    an exciter armature winding disposed on the rotating portion to realize the magnetic field, and configured to generate an AC voltage in response to rotationally interacting with the magnetic field;
    a first channel comprising:
        a first main field winding disposed on a rotating portion of the generator;
        at least one first secondary primary winding disposed on the rotating portion; and
        a first main field power converter disposed on the rotating portion, the first main field power converter configured to selectively deliver the voltage from the exciter armature winding to the first main field winding in response to a first channel control signal; and
    a second channel comprising:
        a second main field winding disposed on a rotating portion of the generator;
        at least one second secondary primary winding disposed on the rotating portion; and
        a second main field power converter disposed on the rotating portion, the second main field power converter configured to selectively deliver the voltage from the exciter armature winding to the second main field winding in response to a second channel control signal.

10. The generator of claim 9, wherein the first and second channels are selectively operable independently from one another.

11. The generator of claim 10, wherein the respective first and second main field power converters may be independently disabled to remove excitation from the respective first and second main field winding in response to an overvoltage condition on the respective first and second channel.

12. The generator of claim 11, wherein voltage at the output of the first channel is cutoff in response to disabling the first main field power converter, while the second main field power converter is enabled to maintain voltage at the output of the second channel.

13. The generator of claim 12, wherein
the first channel further comprises:
a first channel primary winding disposed on the stationary portion to transmit the first control signal to the at least one first channel secondary winding; and
the second channel further comprises:
a second channel primary winding disposed on the stationary portion to transmit the second control signal to the at least one second channel secondary winding.

14. The generator of claim 13, wherein each of the first and second main field rotating power converters comprise:
a high-side switch connected between a positive DC voltage of a rotating DC bus and a high side of a respective main field winding;
a low-side switch connected between a negative DC voltage of the rotating DC bus and a low side of a respective main field winding;
a first diode connected between the high side of a respective main field winding and the negative DC voltage; and
a second diode connected between the low side of a respective main field winding and the positive DC voltage.

15. The generator of claim 14, wherein the high-side switch and the low-side switch are turned On to allow the DC voltage provided by the rotating DC bus to be supplied to a respective main field winding and turned Off to rapidly decrease current to zero in a respective main field winding via the first and second diode.

16. The generator of claim 15, wherein the at least one first channel secondary winding includes a first channel secondary winding that delivers a first control command to the high-side switch of the main field rotating power converter and second channel secondary winding that delivers a second control command to the low-side switch of the first main field rotating power converter, and the at least one second channel secondary winding includes a third channel secondary winding that delivers a third control command to the high-side switch of the second main field power converter and fourth channel secondary winding that delivers a fourth control command to the low-side switch of the second main field rotating power converter.

* * * * *